United States Patent [19]
Cook, Sr. et al.

[11] Patent Number: 5,616,521
[45] Date of Patent: Apr. 1, 1997

[54] SIDE PORT PACKAGE FOR MICROMACHINED FLUID SENSOR

[75] Inventors: James T. Cook, Sr., Antioch; David D. Arnold, Saratoga; Christos Cartsonas, Menlo Park, all of Calif.

[73] Assignee: Sensym, Incorporated, Milpitas, Calif.

[21] Appl. No.: 485,186

[22] Filed: Jun. 6, 1995

Related U.S. Application Data

[62] Division of Ser. No. 418,330, Apr. 7, 1995.
[51] Int. Cl.$^6$ ................................................ H01L 21/60
[52] U.S. Cl. ........................... 438/51; 29/840; 438/125
[58] Field of Search ................................. 437/209, 211, 437/212, 214, 215, 217, 218, 219, 220; 257/692, 693, 694, 726, 727; 73/708, 754, 756

[56] References Cited

U.S. PATENT DOCUMENTS

| 3,689,684 | 9/1972 | Cox, Jr. et al. | 174/68.5 |
|---|---|---|---|
| 4,426,406 | 1/1984 | Brooks et al. | 427/58 |
| 4,703,393 | 10/1987 | Yamamoto et al. | 257/692 |
| 4,876,893 | 10/1989 | Kato et al. | 73/708 |
| 4,984,466 | 1/1991 | Yasui et al. | 73/721 |
| 5,048,181 | 9/1991 | Grider | 29/840 |
| 5,101,665 | 4/1992 | Mizuno | 73/756 |
| 5,130,780 | 7/1992 | Kumai et al. | 257/696 |
| 5,174,158 | 12/1992 | Kremidas | 73/721 |
| 5,184,107 | 2/1993 | Maurer | 338/42 |
| 5,279,164 | 1/1994 | Araki et al. | 73/708 |
| 5,285,690 | 2/1994 | Koen et al. | 73/756 |
| 5,341,684 | 8/1994 | Adams et al. | 73/756 |
| 5,404,756 | 4/1995 | Briggs et al. | 73/718 |
| 5,465,626 | 11/1995 | Brown et al. | 73/754 |
| 5,544,529 | 8/1996 | Mitani et al. | 73/754 |

FOREIGN PATENT DOCUMENTS

| 61-110023 | 5/1986 | Japan. | |
|---|---|---|---|
| 2-245631 | 10/1990 | Japan. | |
| 4-102036 | 4/1992 | Japan | G01L 9/00 |
| 6-50834 | 2/1994 | Japan. | |

Primary Examiner—Kevin Picardat
Attorney, Agent, or Firm—Skjerven, Morrill, MacPherson, Franklin & Friel; Norman R. Klivans

[57] ABSTRACT

An integrated circuit-type DIP package for micromachined (silicon) sensors such as pressure sensors has the fluid ports necessary for operation of the pressure sensor located laterally (rather than extending vertically) from the upper and lower portions of the assembled package. This lateral arrangement includes a first nozzle extending laterally from the upper surface of the package cover (lid) and a side port communicating with a second nozzle located in the lateral surface of the package body. This provides a low profile package by eliminating the otherwise vertical nozzles and also allows mounting of such a package on a printed circuit board without the need to drill a hole to accommodate the nozzle extending from the bottom of the package. The side ports also enhance the ability to mount the package and temporarily plug the side ports during cleaning of the printed circuit board, since the side ports are easily accessible rather than being hidden underneath the package when mounted. This package is suitable for absolute, differential and gage types of pressure sensors as well as other types of sensors where it is necessary for fluid to enter the sensor housing. The lateral ports also reduce stress on the sensor due to less bending of the fluid tubes attaching to the package nozzles, hence eliminating certain types of package-induced failure.

2 Claims, 3 Drawing Sheets

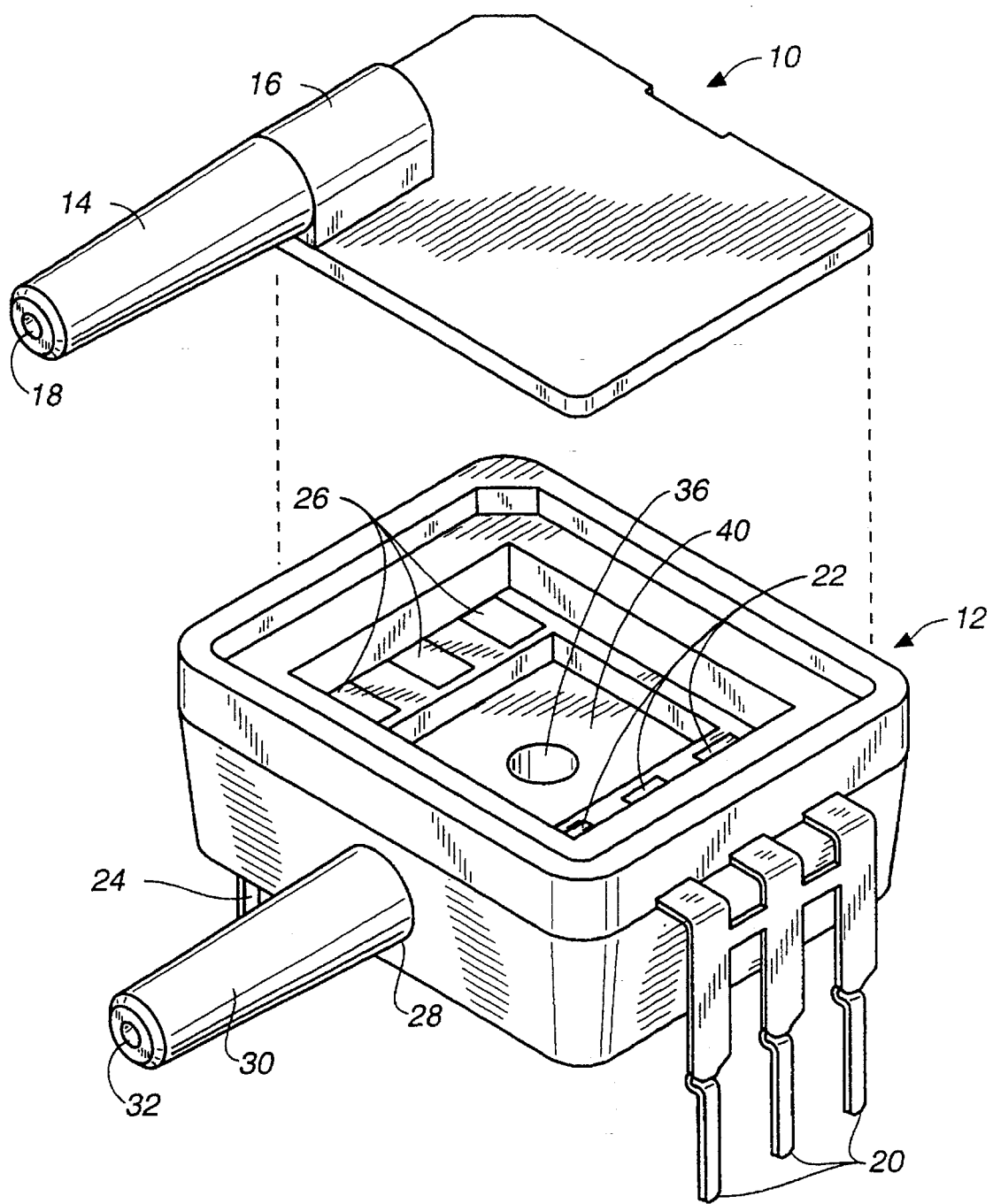
FIG._1

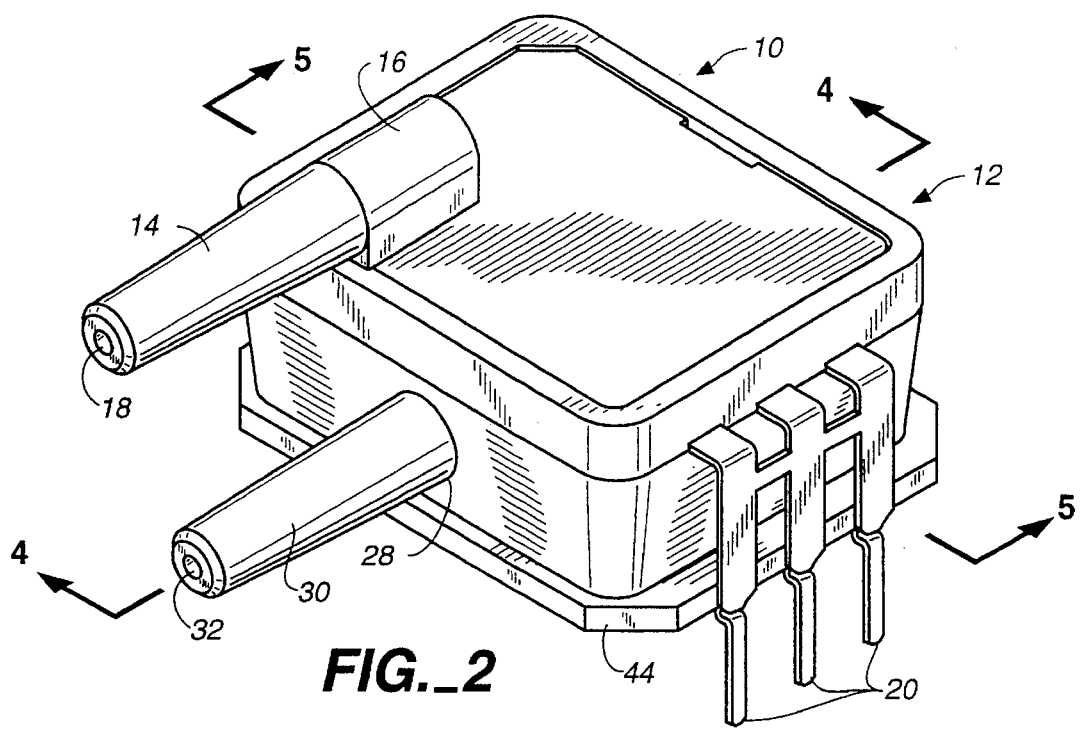
FIG._2
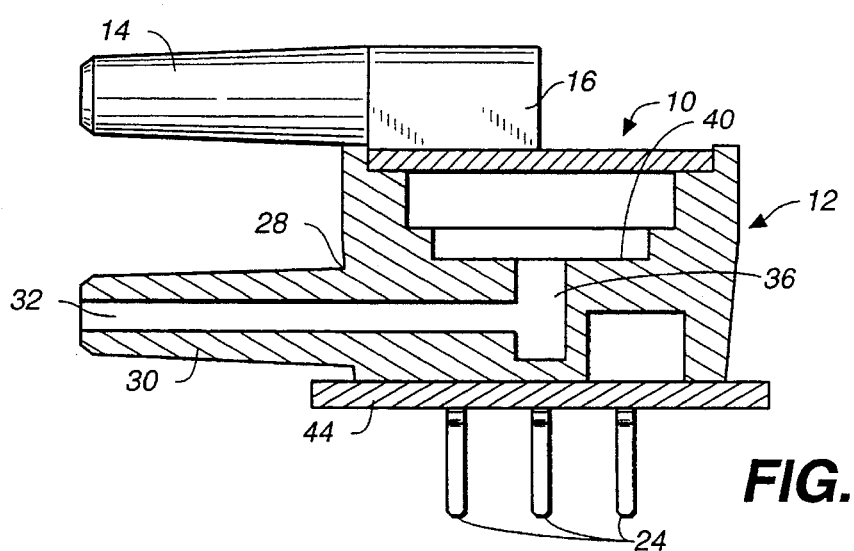
FIG._4
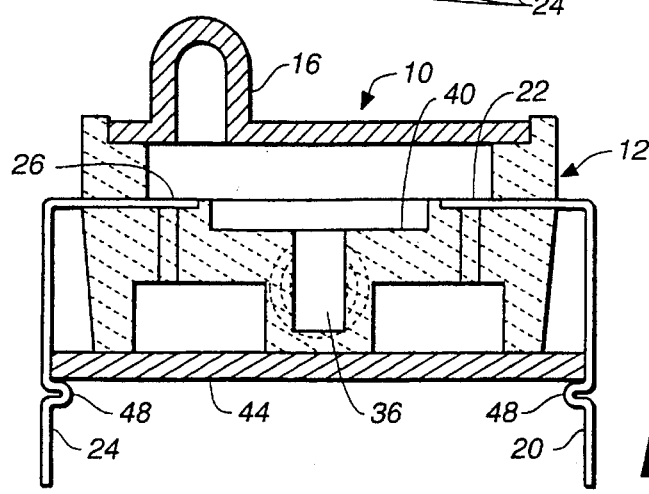
FIG._5

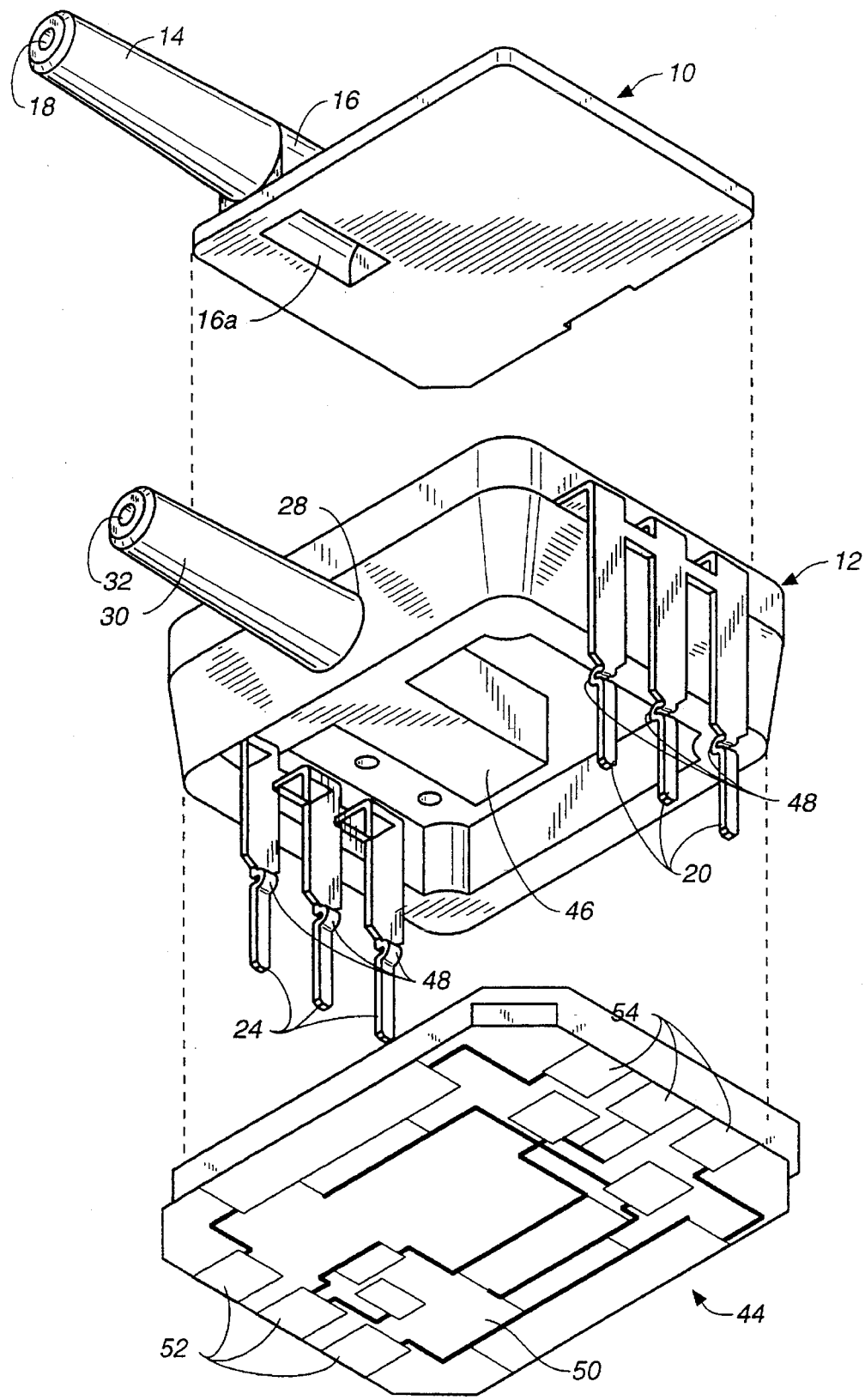
FIG._3

SIDE PORT PACKAGE FOR MICROMACHINED FLUID SENSOR

This application is a division of application Ser. No. 08/418,330, filed Apr. 7, 1995.

BACKGROUND OF THE INVENTION

1. Field of the Invention

This disclosure pertains to packaging for micromachined fluid sensors, and more specifically to such a package especially suitable for mounting where there is limited vertical clearance.

2. Description of the Prior Art

Micromachined (fabricated by integrated circuit-type technology) fluid pressure sensors are well known. A typical such sensor is housed in a plastic dual in-line package (DIP) of the type commonly used for integrated circuits. Such packages are adapted for the sensor application by providing one or two holes (ports) allowing the fluid access to the sensor itself. Such sensors typically require fluid to be able to contact both the upper side and the lower side of the (silicon) substrate in which the sensor is formed in order to measure pressure. In e.g. gage applications one of the access ports merely provides exposure to the ambient atmosphere.

Typically, at least the port in the upper portion of the package lid (cover) is in communication with an extension which is a nozzle (tube) approximately 1 cm long defining a central bore and thereby communicating via the port with the package interior. This nozzle is suitable for attachment to a suitable length of tubing for conducting fluid, the pressure which is to be measured, to the upper surface of the sensor inside the package. Typically a second port in the bottom surface of the body of the package allows a second fluid (such as the ambient atmosphere) to contact the bottom surface of the sensor.

The second port in some applications (where the second fluid is not the ambient atmosphere) is also attached to a similar second nozzle (tube) extending from the package body bottom surface, again this nozzle defining a central bore in communication with the interior of the package for access to the lower surface of the sensor. Due to the length of the package leads which electrically connect the sensor to the supporting printed circuit board and also fasten it thereto mechanically, a hole must be drilled through the printed circuit board to accommodate this second nozzle. Any tubing to be attached to the second nozzle is then attached on the undersurface of the printed circuit board.

This configuration has several drawbacks. One is that the nozzle extending vertically out of the package lid requires a significant amount of vertical clearance in order to attach the tubing to it, and the end of the tubing must bend at 90° at the point of connection to the end of the nozzle. This undesirably requires considerable vertical clearance to whatever is located above the sensor package, e.g. another printed circuit board or some other structure inside an instrument.

Similarly, the need to drill a hole through the printed circuit board to accommodate the second nozzle complicates assembly, as does the need to locate any tubing connecting to the second nozzle on the undersurface of the printed circuit board.

Another drawback in the assembly process is that the nozzle or port in the bottom surface of the package must be temporarily capped or sealed during assembly onto the printed circuit board to prevent contaminants from entering therein, especially during the chemical cleaning of the printed circuit board. However, this sealing is very difficult, especially for the case when the package does not have a nozzle on its lower port but merely has the port to admit ambient air; it is very difficult to seal this port since the port is almost in contact with the printed circuit board. Therefore access is difficult if not impossible once the package has been mounted on the circuit board but during the necessary circuit board cleaning.

It has been found by the present inventors that the attachment of the tubes to both the lid and body of the package, such tubes requiring a 90° bend, creates a certain amount of internal strain in the package and stress on the tubes, due to the 90° bend and the need to bend and attach the bent tubing to the nozzles. This has been found to induce stress on the sensor die (substrate) due to the accompanying stresses on the package. This undesirably tends to cause a certain amount of failure of the package and/or the sensor die.

SUMMARY

In accordance with the invention, an improved package for a micromachined (silicon) sensor, for instance a pressure sensor, has access ports in the package to both the upper and lower surface of the sensor arranged in a lateral orientation i.e., in a plane parallel to that defined by the principal surface of the sensor die. Thus typically one port is located in a lateral surface of the package body and the second port is located extending laterally on the upper surface of the package lid. Thus each port extends laterally in a plane parallel to the principal surface of the sensor die, providing a low profile package and hence reducing the needed vertical clearance.

Also, eliminated thereby is the need to drill a hole through the supporting printed circuit board, since the lower port instead is accessible from the upper surface of the printed circuit board.

The prior art problem with printed board cleaning is also eliminated, since the port which was previously present on the bottom surface of the package body is no longer at that location, but instead is at a more easily accessible lateral surface of the package, and can be easily sealed and unsealed even after the package is mounted on the circuit board.

Another resulting advantage is that the tube(s) attaching to the ports need not bend at 90°, but instead simply extend straight from the laterally located access ports on the package, thus reducing mechanical strains on the package and on the sensor die housed therein, thereby reducing the number of potential failure modes.

Also provided is molded-in reinforcing inside the package for both the mounting structure for the sensor die and also for the nozzle structures, which are an integral portion of the lid and body of the package. This reinforcement alleviates stress from the package leads attached to the printed circuit board and also from the tubing attached to the nozzles.

Also provided is an improved method of mounting a temperature (or other type) compensation circuit on an exterior wall of a sensor package. This compensation circuit, formed on a ceramic or similar solderable substrate, is attached to the bottom surface of the package body at a set of bends (notches) formed in the sensor package leads which extend outward from the package body. The ceramic substrate is placed on the bottom surface of the package and held in place by the bends in the package leads, and then at the bends the leads are soldered to conductive pads on the surface of the ceramic substrate. This is much simpler than the conventional method of using a lead frame for attachment of the compensation circuit to the package and hence improves reliability and yield.

BRIEF DESCRIPTION OF THE DRAWINGS

FIG. 1 shows an exploded perspective view of the present package.

FIG. 2 shows a perspective view of the present package assembled with an external compensation circuit.

FIG. 3 shows an exploded view of the package of FIG. 2.

FIGS. 4 and 5 are cross sections of FIG. 2.

Identical reference numbers in different figures refer to identical structures.

DETAILED DESCRIPTION OF THE PREFERRED EMBODIMENTS

FIG. 1 shows an exploded view of the present sensor package. The lid 10, shown detached from the body 12, is a conventional planar lid with the addition of nozzle portion 14 extending laterally from its upper surface at port 16. Nozzle 14 has a central bore 18 which provides, as further described below, access to the interior portion of the sensor package.

The body portion 12 includes conventional metal DIP leads 20 which extend into the interior portion of the package as shown at 22. The other set of leads 24 on the other side of the body 12 is mostly not visible; a portion of one of these other leads 24 is visible, also extending into the interior of the package as shown at 26.

The body 12 of the package has a port 28 on its lateral surface from which extends nozzle 30 having central bore 32 extending into the interior of the package by means of interior passage 36.

The actual sensor die (not shown) conventionally sits on base 40 so wire bonds can connect the die to metal contacts 22 and 26, as well as the die underside being exposed to fluid entering through passage FIG. 2 shows an assembled view of the structure of FIG. 1 with identical reference numbers indicating identical structures. Also shown in FIG. 2 is the temperature compensation substrate 44 which is a separate structure and connected electrically and mechanically to package body 12 as described further below. It is to be understood that temperature compensation substrate 44 is not necessary for use of the package.

FIG. 3 is an exploded view of FIG. 2 and shows port 16a which is formed through lid 10 communicating with nozzle 14. Also shown in FIG. 3 (on the underside of body 12) is plastic reinforcing structure 46 for reinforcing the nozzle 30 where it connects with the main portion of the package body 12. FIG. 3 also shows detail of temperature compensation substrate 44. The actual temperature compensation circuitry 50 is shown electrically connected to two sets of bonding pads 52 and 54 located at opposing edges thereof on substrate 44 for mechanically and electrically contacting respectively package leads 24 and 20 at notches (bends) 48 formed in leads 20 and 24 as described further below. (These bends are not illustrated in FIGS. 1 and 2.)

FIG. 4 shows a cross section through line 4—4 in FIG. 2. Again the temperature compensation substrate 44 is shown. As shown in FIG. 4, central bore 32 of nozzle 30 extends all the way to the passage 36 formed in package body 12, thus communicating with the lower surface of the sensor die which sits on base 40.

FIG. 5 shows an additional cross section through lines 5—5 of FIG. 2 illustrating better the structure of lateral port 16 in the package lid 10. As can be seen in FIG. 5, the inner portions 26 and 22 of the leads are merely continuations of the exterior leads 24 and 20 respectively. Also as shown in FIG. 5, bends (notches) 48 formed in leads 20 and 24 hold temperature compensation substrate 44 against the underside of package body 12.

In one version the present sensor package lid 10 and body 12 are each molded from an engineering plastic such as General Electric Ultem 1000 or alternatively MP190 (10% glass filled) or other suitable plastics as are typically used for integrated circuit packaging. A typical diameter of bores 18, 32 of the nozzles is 0.035 inches, but this and other dimensions and materials disclosed herein are not limiting but merely illustrative.

The present embodiment is a DIP package; however, this is not limiting, and other types of well known packaging such as surface mount, J-leads, or other types of packaging also may be adapted in accordance with the present invention.

The embodiment disclosed herein has two nozzles 14, 30, formed respectively on the package lid 10 and on the package body 12. Alternatively for a gage application, there is a nozzle 30 on port 28 formed in the package body 12, and only a port 16a in the package lid 10.

Advantageously, the side mounted port(s) in accordance with the invention make mounting the package sensor on a circuit board easier. That is, the mounting process involves first conventionally mounting and connecting the sensor die inside the body 12 of the package and then sealing the package body 12 with the lid 10. The assembled package is then mounted on the circuit board.

The side ports, especially the lower port 28 communicating with the package body, 12, are then temporarily sealed, using for instance a plastic cap or wax, to prevent any contaminants from entering therein. The circuit board is then conventionally cleaned and soldered. The temporary seal prevents any of the cleaning solvents or solder from entering the package and damaging the sensor die. Then after the package has been soldered to the circuit board, the temporary seal is easily removed, due to the easy access to the lateral portions of the package. The sensor may then be operated as usual.

The present package is suitable for use both with absolute pressure measurements, where typically the lid 10 is attached to the body 12 using an epoxy based rigid type seal, and also for differential pressure measurements where the lid 10 is attached to the package body 12 using a conventional RTV silicon based adhesive. Other typical adhesives used for closure of such sensor packages are also suitable.

FIG. 3 shows how structures 16, 46 provided, respectively, in the package lid 10 and package body 12, reinforce the area at the ports leading to the nozzles. Also, reinforcement is provided (see FIG. 1) at base 40 where the sensor die is attached, to provide greater package rigidity. Package rigidity has been recognized by the present inventors to prevent damage to the sensor die during mounting on the package to the substrate, and also when the fluid tubes are attached to the nozzles. This reinforcing alleviates any stress from the circuit board, package leads, or fluid tubes and prevents damage to the die and poor performance resulting therefrom, including any thermal expansion of the leads.

External compensation circuits for use with micromachined sensors are well known. Such compensation circuits compensate for e.g. temperature and are typically mounted on the bottom exterior surface of the sensor package. Such a compensation circuit is typically formed on a ceramic or FR4 substrate and could include several semiconductor devices, including resistors which are laser trimmed, and then the compensation circuit is mounted on the bottom surface of the sensor package.

In the prior art this compensation circuit substrate typically includes a lead frame structure that fits over the leads extending from the bottom surface of the sensor package. The lead frame is then butt jointed to the leads on the sensor package and the lead frame is soldered to the package leads. This process typically involves a certain amount of failure, i.e. reduces yield, and is somewhat complex due to requiring the lead frame.

In accordance with the present invention (although not necessary and independent of the laterally extending side ports), an improved attachment method as described briefly above is provided for compensation circuit 44 which is external to the sensor package. Bends 48 are formed in each of leads 20, 24 extending from the bottom surface of the body 12 of the sensor package. Then the compensation circuit substrate is held on the bottom surface of the body 12 between the bottom surface and the bends 48. The conductive pads 52, 54 of the compensation circuit substrate 44 immediately adjacent each of the bends 48 are then each reflow soldered to the leads 20, 24 at the bends. Then the resistors (not shown) on compensation circuitry 50 are laser trimmed. (This attachment and trimming are typically done before the assembled sensor package is mounted on the printed circuit board).

Besides advantageously eliminating the prior part lead frame and also providing a better mechanical connection between the compensation circuit substrate and the sensor package, cost is reduced and yield increased, and reliability improved. This attachment process is not limited to compensation circuits, but it is applicable to other circuits to be applied to the external portion of an integrated circuit-type package. This process also is not limited to the particular materials described herein but is applicable to any insulating substrate that is adaptable to being soldered to electrical leads.

This disclosure is illustrative and not limiting; further modifications would be apparent to one skilled in the art in light of this disclosure and are intended to fall within the scope of the appended claims.

We claim:

1. A method of mounting a sensor on a circuit board, comprising the steps of:

fixing the sensor in a housing, the housing having a lid and a body, each defining a port connecting an interior of the housing to an exterior of the housing;

mounting the housing on the circuit board with the sensor fixed inside the housing;

temporarily sealing at least the port in the body of the housing;

cleaning the circuit board with the housing mounted thereon, after the step of temporarily sealing; and then, after the step of cleaning, unsealing the sealed port.

2. A method of mounting a compensation circuit on an integrated sensor housing, the housing being a dual in line integrated circuit-type package including a plurality of conductive leads extending from an exterior of the package, the method comprising the steps of:

forming the compensation circuit on a substrate, the substrate having a width and length about equal to that of a bottom surface of the package;

forming a plurality of bends in the conductive leads, the bends corresponding in location to conductive pads on the substrate;

placing the substrate on the bottom surface of the package, the conductive leads fitting between the bottom surface of the package and the bends in the conductive leads; and soldering each conductive lead at its bend to the substrate at a corresponding conductive pad on the substrate.

* * * * *